(12) United States Patent
Parker et al.

(10) Patent No.: US 6,374,110 B1
(45) Date of Patent: Apr. 16, 2002

(54) INTERFACE BETWEEN CELLULAR AND WIRED NETWORKS WITH ENHANCED SUBSCRIBER MOBILITY

(75) Inventors: Jerry Joe Parker, Richardson, TX (US); John O'Connell, L'eteng la Ville (FR); Stewart Hodde Maxwell, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/618,083

(22) Filed: Jul. 17, 2000

Related U.S. Application Data

(63) Continuation of application No. 08/851,517, filed on May 5, 1997, now Pat. No. 6,167,271.

(51) Int. Cl.[7] .................................................. H04Q 7/20
(52) U.S. Cl. ........................ 455/445; 455/74.1; 455/560
(58) Field of Search ................................. 455/445, 560, 455/561, 554, 555, 507, 422, 74, 74.1, 522, 557, 432

(56) References Cited

U.S. PATENT DOCUMENTS

| 5,764,730 A | * | 6/1998 | Rabe et al. ................. 455/455 |
| 5,771,452 A | * | 6/1998 | Hanley et al. .............. 455/445 |
| 5,809,066 A | * | 9/1998 | Suomi et al. ............... 455/557 |
| 5,822,694 A | * | 10/1998 | Coombes et al. ........... 455/433 |
| 5,887,266 A | * | 3/1999 | Heinonen et al. ........... 455/458 |
| 5,926,755 A | * | 7/1999 | Ghisler ........................ 455/414 |
| 5,953,651 A | * | 9/1999 | Lu et al. ...................... 455/408 |
| 6,061,346 A | * | 5/2000 | Nordman ..................... 370/352 |
| 6,167,271 A | * | 12/2000 | Parker et al. ................ 455/445 |

* cited by examiner

Primary Examiner—William Trost
Assistant Examiner—Tilahun Gesesse
(74) Attorney, Agent, or Firm—Haynes and Boone, LLP

(57) ABSTRACT

A system to enable communication between a base station controller (24) within a cellular network (12), and a wired telephone system (38, 39) in a wired subscriber loop (113), wherein the base station controller (24) is responsive to, and generates, cellular network signaling, and the wired telephone system is responsive to, and generates, wired signals. The system includes: a protocol processor (121) receptive to the wired signals, for generating processed signals; and a terminal adapter controller (34) conductively coupled both to the base station controller (24) and to the protocol processor (121), receptive to the processed signals, for generating cellular network signaling. In another feature of the invention, the cellular network signaling is GSM signaling. In another feature of the invention, the system also includes a voice service module (123) conductively coupled to the protocol processor, for compressing voice data to standard cellular compression. In another feature of the invention, the system also includes means (150) for converting mobility events in the wired telephone system to cellular network signaling.

20 Claims, 10 Drawing Sheets

| GSM RIL3 CC | GSM RIL3 MM | GSM RIL3 RR |
|---|---|---|
| LAYER 2: T1.602 (Q.921) | | |
| LAYER 1: T1.601 | | |

INTERFACE BETWEEN CELLULAR AND WIRED NETWORKS WITH ENHANCED SUBSCRIBER MOBILITY

This application is a continuation of Ser. No. 08/851,517, filed May 5, 1997, now U.S. Pat. No. 6,167,271.

TECHNICAL FIELD

The invention relates generally to cellular communication networks and, more particularly, to wired access to a cellular network.

BACKGROUND OF THE INVENTION

As cellular telephone service has increased, a need has arisen for a single telephony system that can service a subscriber both at his home, that is, fixed-base, or stationary, and when he is away from home, or mobile.

U.S. Pat. Nos. 5,412,760 and 5,528,665, issued to Peitz, describe a telephone system for both mobile and stationary subscribers, in which the stationary subscribers are not assigned permanent channel pairs, but rather ate treated as the mobile subscribers, and are assigned channel pairs at the time a telephone connection is made. All connection channel pairs are within the frequency spectrum of the broad band cable connecting the stationary subscribers.

However, the Peitz patents do not contemplate using unshielded copper pair telephone lines normally used for ISDN basic rate service. Rather, they teach installing new digital, preferably fiber optic, cables to subscribers' homes.

Analog cellular telephone service originally developed independently in various countries, each country's equipment and service incompatible with the others'. The Europeans eventually agreed on standards for digital cellular telephone service, called "GSM" ("Global System For Mobile Communications"). The European Telecommunication Standards Institute (ETSI) published phase I of the GSM specifications in 1990. ETSI published some GSM Technical Specifications, version 5.1.0, in March, 1996.

A need exists for a single telephone system for both mobile and stationary subscribers, which uses unshielded copper pair telephone lines normally used for ISDN basic rate service, and which is compatible with the GSM standards.

SUMMARY OF THE INVENTION

The present invention, accordingly, provides a system and method to enable communication between a base station controller within a cellular network, and a wired telephone system in a wired subscriber loop, wherein the base station controller is responsive to, and generates, cellular network signaling, and the wired telephone system is responsive to, and generates, wired signals. The system comprises a protocol processor receptive to the wired signals, for generating processed signals; and a terminal adapter controller conductively coupled both to the base station controller and to the protocol processor, receptive to the processed signals, for generating cellular network signaling.

In another feature of the invention, the cellular network signaling is GSM signaling. In another feature of the invention, the system also includes a voice service module conductively coupled to the protocol processor, for compressing voice data to standard cellular compression. In another feature of the invention, the system also includes means for converting mobility events in the wired telephone system to cellular network signaling.

The invention achieves a technical advantage in that it provides the same services to wireline subscribers as it provides to mobile subscribers.

The invention achieves another technical advantage in that it uses existing local loop with services provided by an existing MSC, so that an operator has to add neither wireline switching capabilities, nor use cellular radio frequency transmission spectrum for local loop service.

The invention achieves another technical advantage in that it provides standard interfaces for analog and ISDN BRI telephone sets, so that subscribers may use their existing telephone sets.

The invention achieves another technical advantage in that it complies with the A-bis interface from a base transceiver station to a base station controller, so that there is no change required in the construction or operation of 1) the base station controller, and 2) a mobile services switching center.

BRIEF DESCRIPTION OF THE DRAWINGS

FIG. 5 is a flow chart of the algorithms used by the TA 36 when it is powered on.

DESCRIPTION OF THE PREFERRED EMBODIMENT

This description uses the following abbreviations:

| | |
|---|---|
| 2B + D | see BRI |
| BRI | ISDN Basic Rate Interface; 144,000 bits per second, two bearer channels, and one D channel |
| BSC | Base Station Controller |
| BTS | Base Transceiver Station |
| EFR | Enhanced Full Rate |
| ETSI | European Telecommunication Standards Institute |
| GSM | Global System For Mobile Communications |
| GSM _._ | ETSI GSM Technical Specification _._ |
| HLR | Home Location Register |
| HSCSD | High Speed Circuit Switched Data |
| IMSI | International Mobile Subscriber Identity. |
| ISDN | Integrated Services Digital Network |
| ISDN Q.921 | ITU-telecommunications recommendation for Layer 2 Basic Access User-to-Network Interface. Q.921 is commonly used as a reference to the interface specified by ANSI T1.602-1989. |
| ISDN Q.931 | ITU-telecommunications recommendation for |

-continued

| | |
|---|---|
| | Layer 3 basic call control. Q.931 is commonly used as a reference to the interface specified by ANSI T1.607-1990. |
| LAC | Location Area Code |
| LAPDm | Link Access Protocol For The Mobile D Channel |
| LEC | Local Exchange Carrier |
| MSC | Mobile Services Switching Center |
| MS | Mobile Subscriber |
| MSISDN | Mobile Subscriber ISDN Number |
| OAM | Operations, Administration, and Maintenance - network management functions |
| OMC-R | Radio Operations and Maintenance Center |
| OMT | Operations and Maintenance Terminal |
| PLMN | Public Land Mobile Network |
| POT | Plain Old Telephone, one example of a "Set" |
| SIM | Subscriber Identity Module, a "smart" card inserted into a mobile telephone. The SIM contains subscriber-related data. |
| SOHO | Small Office/Home Office |
| TCU | Transcoder Unit |
| TA | Terminal Adapter |
| TAC | Terminal Adapter Controller |
| TCH | Traffic Channel |
| VLR | Visitor's Location Register, a local database to an MSC for registering visiting mobile station users. |

For definitions of other abbreviations, and definitions of other terms, see Newton's Telecom Dictionary, 11th edition, 1996.

Figures 1, 4:
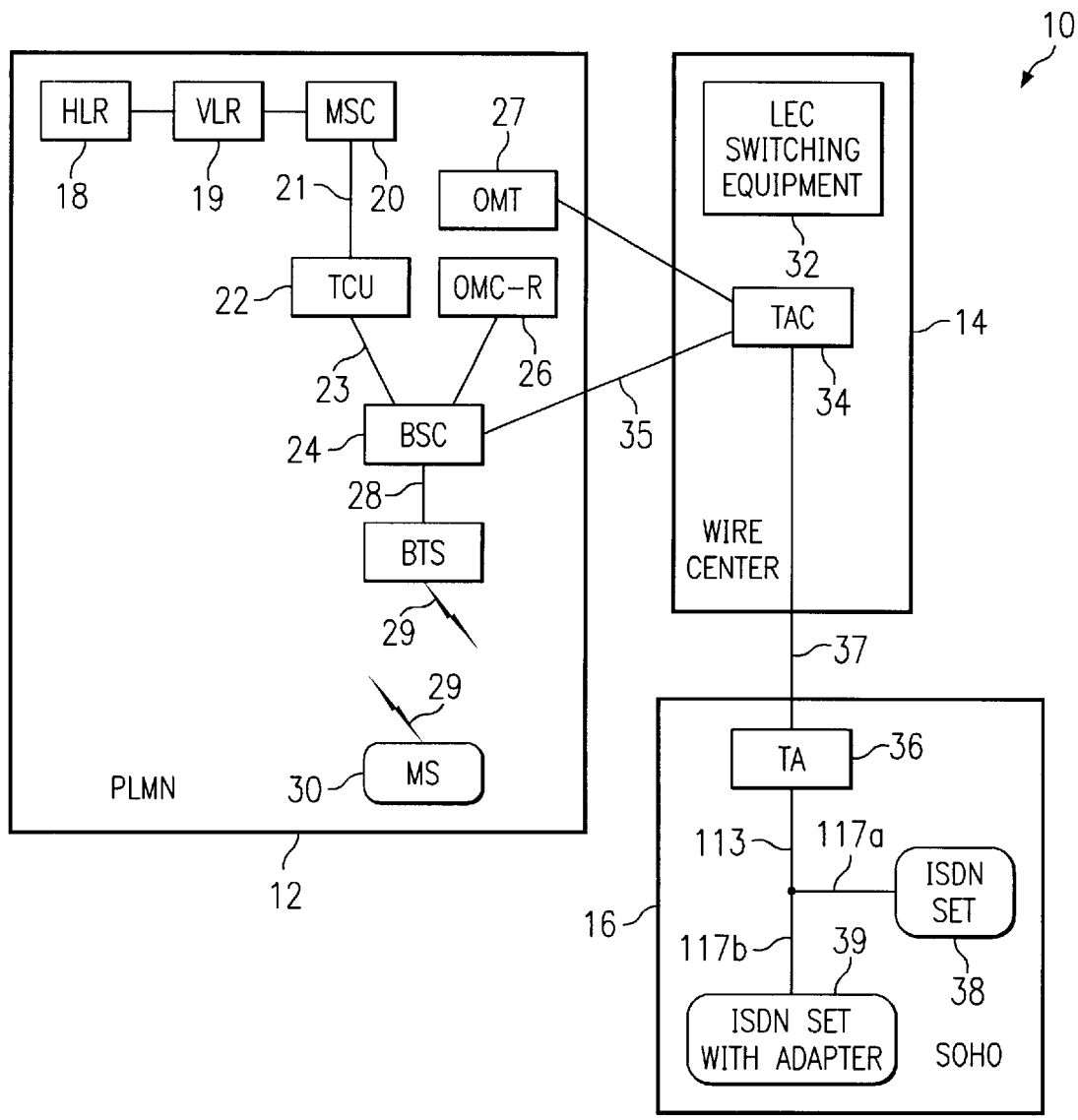
FIG. 1 is a block diagram of the GSM wired access system of the present invention.
FIG. 4 is a table listing the combination of ISDN protocols and GSM protocols used to carry signaling information.

Referring to FIG. 1, the GSM wired access system 10 of the present invention includes a PLMN 12, a wire center 14, and a SOHO or residence 16. The PLMN 12 has an HLR 18, which connects to an MSC 20. The MSC 20 connects via an A-i/f interface 21 to a TCU 22. The TCU 22 connects via an A-ter interface 23 to a GSM network's base station controller ("BSC") 24. An Operations and Maintenance Center for the Radio ("OMC-R") 26 also connects to the BSC 24. The BSC 24 connects to a BTS 28. The BTS 28 connects via an air interface 29 ("wireless signals") to a wireless set, "GSM MS" 30.

The wire center 14 has LEC switching equipment 32 and a GSM wired terminal adapter controller ("TAC 34"). The TAC 34 connects to both the BSC 24 and an operation and maintenance terminal ("OMT") 27. Although the OMT 27 is shown as located in the PLMN 12, it could be located anywhere. The TAC 34 connects via an A-bis interface 35 to the BSC 24. The SOHO 16 has one or more GSM wired terminal adapters ("TA 36"), which connects to the TAC 34 via an ISDN BRI compatible subscriber loop 37. The TA 36 also connects to an ISDN set 38, and an analog set-with-an-ISDN-adapter 39. In a oversimplified sense, the TAC 34 is a BTS with wired connections to the TA 36, which functions like an MS. Together, the TAC 34 and the TA 36 are means for converting wired signals to cellular network signaling.

GSM Wired Terminal Adapter Controller (TAC 34)

Figure 2:
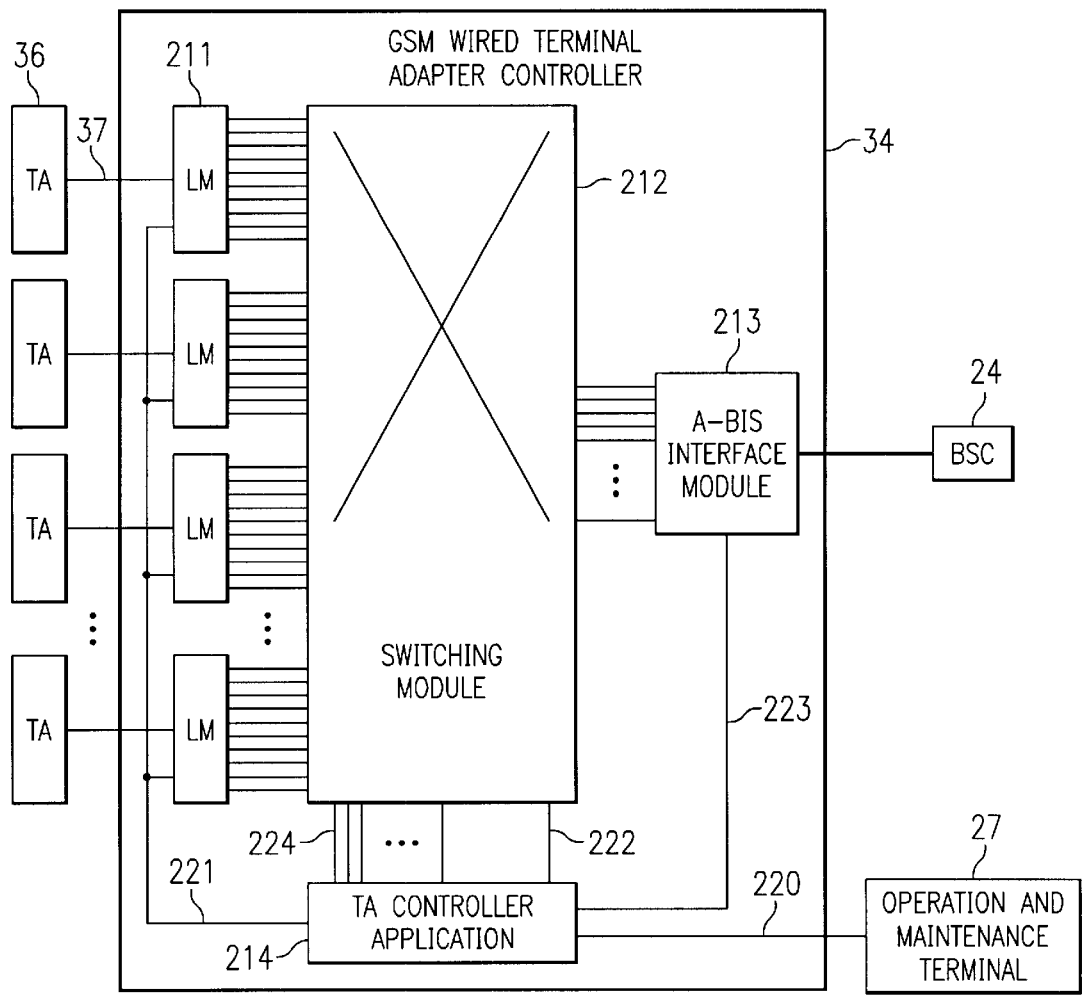
FIG. 2 is a schematic, in block diagram form, of the TA 36 of FIG. 1.

Referring now to FIG. 2, the TAC 34 connects several TA's 36 (although only one TA 36 is shown in FIG. 1) to the BSC 24. The TAC 34 contains several line modules 211 which terminate the wired subscriber loops 37 connecting the TA's 36 to the TAC 34. The TAC 34 also contains an A-bis interface module 213 which presents the standard GSM A-bis interface to the BSC 24 as described in ETSI GSM Technical Specifications for GSM A-bis Interface:
GSM 8.51, Version 4.1.0, March 1995;
GSM 8.52, Version 4.2.0, August 1995;
GSM 8.54, Version 5.0.0, December 1995;
GSM 8.56, Version 4.0.2, September 1994; and
contains a switching module 212, an operations and maintenance terminal interface 220, and a terminal adapter controller application 214 (shown in FIG. 10).

At each line module 211, the D-channel and the two B-channels from a TA 36 are separated into as many as nine separate connections (1 signaling channel and 8 traffic channels—4 traffic channels from each B-channel) to the switching module 212. The switching module 212 dynamically switches a traffic channel from a line module 211 to the proper circuit of the A-bis interface module 213. The switching module 212 performs this connection switching each time the BSC 24 assigns a channel to the TA 36 in response to a channel request from the TA 36. The terminal adapter controller application 214 determines how to make the connection by looking at the contents of the GSM RIL3-RR channel request and GSM RIL3-RR channel assignment messages to see which circuit the BSC 24 has assigned to the TA 36 for a particular call. The terminal adapter controller application 214 looks at the GSM RIL3-RR channel release message to see when the circuit is released so that it can instruct the switching module 212 break the connection. The TAC 34 does not alter the contents of any of these messages. During each call, the TA controller application 214 stores information from these messages m order to properly instruct the switching module 212 to switch the traffic channel for that call. The TA controller application 214 instructs the switching module 212 via the control link 222 as to when a traffic channel from a line module 211 should be connected to a circuit on the A-bis interface 213, and when the connection should be broken.

In addition to traffic channel switching, the TAC 34 transfers signaling messages, which are transmitted on the D-channel between the TA 36 and the line modules 211, to the proper circuit on the A-bis interface module 213. The switching module 212 connects a D-channel from a line module 211 to the TA controller application 214 through a signaling link 224. The TA controller application 214 multiplexes the messages received on all the signaling links 224 to the A-bis interface module 213. The TA controller application 214 transmits the multiplexed messages to the A-bis interface module 213 via the signaling link 223.

Signaling messages from the BSC 24 are transmitted to the TA controller application 214 by the A-bis interface module 213 across the signaling link 223. The TA controller application 214 transmits each of these messages on the signaling link 224 that is connected to the proper line module 211. The switching module 212 connects each signaling link 224 to a line module 211 as instructed by the TA controller application 214. The TA controller application 214 maps each signaling message received on the signaling link 223 to a line module 211, and the signaling link 224 connected to that line module 211, by examining the the LAPD terminal endpoint identifier in the message.

The TA controller application 214 also monitors the status of each line module 211 through a control link 221.

The TAC 34 transmits unaltered all messages it receives from the TA 36 to the BSC 24. Conversely, the TAC 34 transmits unaltered all messages it receives from the BSC 24 to the appropriate TA 36, with one exception. When the TAC 34 receives a GSM RIL3-RR cipher mode message, it immediately replies with the GSM RIL3-RR cipher mode complete message to the BSC 24. Thus, it is transparent to the BSC 24 and the MSC 20 that no ciphering is performed between the TA 36 and the TAC 34. Ciphering is unnecessary on the wired subscriber loop because the transmission on this loop cannot be intercepted over the air. Ciphering is normally done between a GSM mobile station and a GSM BTS such that the over-the-air transmission is not understandable by anyone intercepting the transmission.

The A-bis interface module 213 is a telephony trunk circuit interface that manages several circuit groups that connect the TAC 34 to the BSC 24. The TA Controller Application 214 monitors and controls the A-bis interface module 213 through the signaling link 223.

The terminal adapter controller application 214 also performs maintenance and administrative operations as directed by the operation and maintenance terminal 27. This includes loading software, changing configuration parameters, and reporting the status of line modules 211 and A-bis interface module 213.

GSM Wired Terminal Adapter (TA 36)

Figure 3:
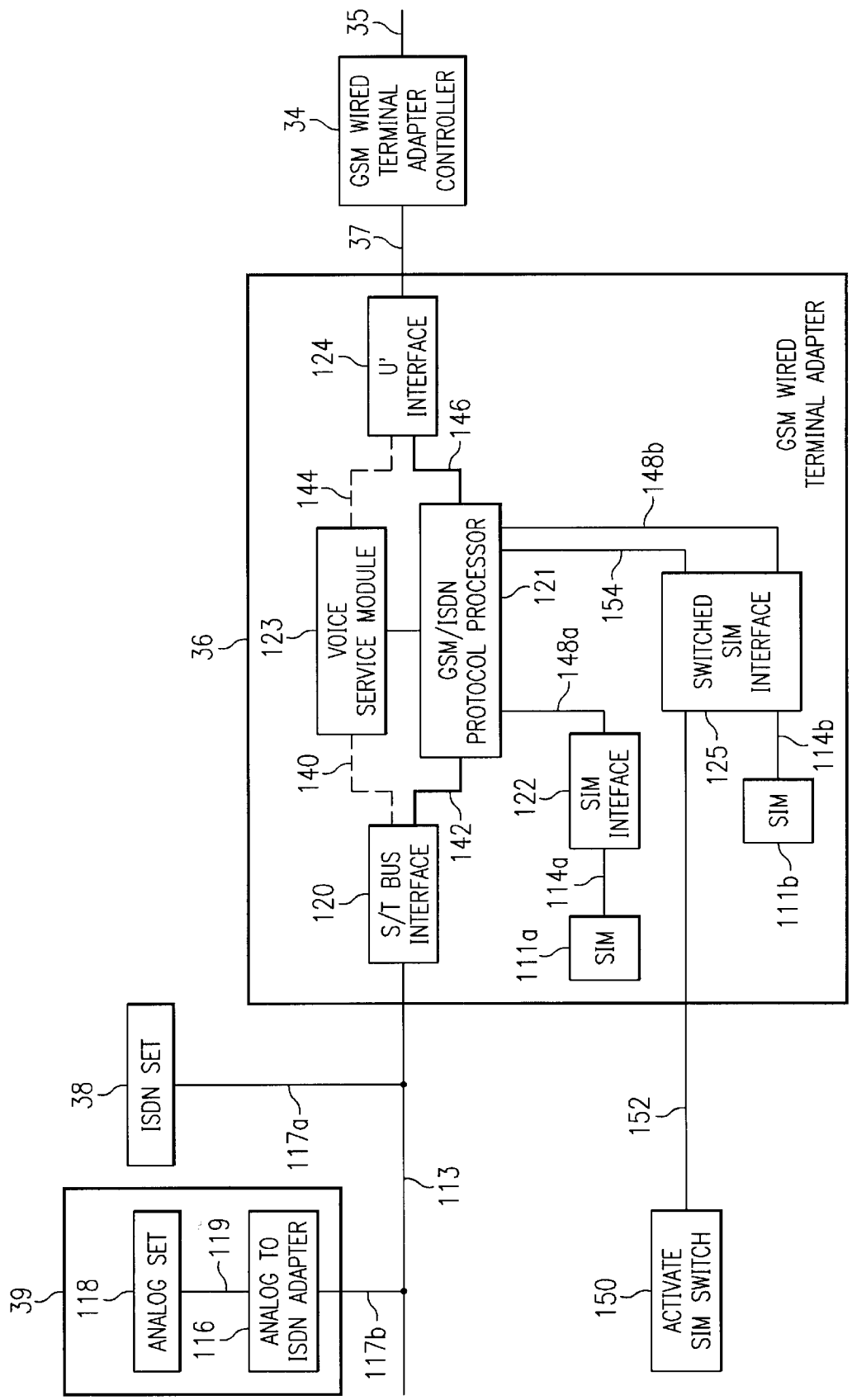
FIG. 3 is a schematic, in block diagram form, of the TAC 34 of FIG. 1.

Referring now to FIG. 3, the TA 36 includes as functional components a GSM/ISDN protocol processor 121, an ISDN S/T bus interface 120, a voice service module 123, a U' Interface 124, a GSM subscriber identity module interface 122, and a switched SIM interface 125.

The protocol processor 121 contains protocol processing logic which converts wired signals (ISDN Q.931 messages) from the S/T bus interface 120 into GSM radio interface layer 3—call control messages which are passed to the U' Interface 124. It also converts GSM radio interface layer 3—call control messages from the U' interface 124 into wired signals (ISDN Q.931) messages which are passed to the S/T bus interface 120 over a control and signaling link 142.

The protocol processor 121 generates (1) GSM radio interface layer 3—mobility management (RIL3-MM) messages in response to mobility events detected in the SOHO 16, and (2) GSM radio interface layer 3—radio resource (RIL3-RR) messages. Both types of messages are sent to the TAC 34 via the U' Interface 124.

The protocol processor 121 also receives and processes GSM RIL3-MM and GSM RIL3-RR messages received from the GSM TAC 34 at the U' Interface 124. GSM 4.08, version 5.3.0, release date July, 1996, which is incorporated herein by reference, describes the processing of these messages. These messages are not passed on to the S/T bus interface 120 or to any terminal attached to the S/T bus interface 120.

The GSM(ISDN protocol conversion and GSM RIL3-MM and RR protocol processing performed by the protocol processor 121 allows the TAC 34 to comply with the A-bis interface 35. This A-bis interface compliance enables the TA/TAC wired access system to be added to an existing GSM wireless network with no hardware or software modifications to the BSC 24, the MSC 20, the HLR 18, and the VLR 19.

GSM RIL3 mobility management messaging allows the GSM network to locate a particular SIM inserted in any TA 36 using the existing GSM network logic for locating a SIM in a mobile station. This means that the directory number used to call a telephone set attached to a TA 36 can be changed simply by replacing the SIM in the TA 36. Furthermore, a TA 36 can be moved from one physical location to another and, assuming that the subscriber loop at the new location is connected to a TAC 34, the TA 36 can be connected and will operate in the new location with the same directory number as in the old location. This is accomplished automatically by the GSM network using existing GSM mobility management procedures with no human interaction by the network operator.

The GSM RIL3-RR messages are transmitted between the TA 36 and BSC 24 unaltered by the TAC 36, but the TAC 36 looks at certain GSM RIL3-RR messages to see how to allocate the traffic channels on the subscriber loop 37.

The protocol processor 121 uses the signaling connection 146 to control and monitor the U' Interface 124, as well as sending and receiving D-channel information (signaling messages) that is transmitted and received by the U' Interface 124.

The voice service module 123 provides several digital signal processing capabilities, but primarily it functions as a GSM enhanced full rate voice encoder/decoder complying with GSM 6.51, version 5.1.0, release date March, 1996. The voice service module 123 compresses the digitally encoded voice signal from the normal 64 kbps wireline rate to the GSM standard 16 kbps fill rate. The voice service module 123 functions as a means for compressing voice data to standard cellular compression.

Both the B-channels of the U' Interface 124 operate at 64 kbps, while the voice service module 123 encodes each conversation at 16 kbps. This means that the U' Interface 124 can support up to eight simultaneous conversations at 16 kbps each. In the preferred embodiment, however, the voice service module 123 just rate adapts each 16 kbps voice channel to a 64 kbps B-channel on the U' Interface 124.

In an alternate embodiment of the GSM Wired Terminal Adapter that enables more than two simultaneous conversations, the voice service module 123 is responsible for multiplexing the 16 kbps conversations onto the 64 kpbs B-channels to the U' Interface 124. In GSM terms, each conversation is referred to as a "traffic channel". So, each B-channel can carry up to four traffic channels multiplexed on it, for a total of eight conversations per TA 36. However, an ISDN S/T bus such as an ISDN S/T bus 113 can support only two B-channels (two simultaneous conversations/data calls).

In the alternate embodiment that uses more than two traffic channels per TA 36, the TA 36 must be constructed with multiple S/T buses, up to four, and each S/T bus is assigned two of the eight traffic channels.

Standard ISDN sets 38 and standard analog-to-ISDN adapters 116 connect to the S/T bus interface 120, which supports the standard ISDN S/T bus 113 defined in ANSI standard T1.605, which is incorporated herein by reference. (ANSI T1.605-1991, ISDN Basic Access Layer 1 Interface at S and T Reference Points, corresponds to ITU-T Recommendation I.430). The S/T bus interface 120 separates the B-channel information from the D-channel signaling information coming into the TA 36 on the S/T bus. The S/T bus interface 120 connects to the voice service module 123 via a connection 140, over which B-channel information passes. B-channel transmission links 140 and 144 carry digitally encoded voice or bearer data (for data transfer use by data calls). The B-channel information passes through the voice service module 123, via the link 144, to the U' Interface 124. When a B-channel is carrying data, the protocol processor 121 instructs the voice service module 123 not to perform EFR voice compression, but to rate adapt the data transfer to 16 kbps. D-channel signaling is transmitted to the protocol processor 121 over the separate signaling and control connection 142.

The U' Interface 124, under control of the protocol processor 121, multiplexes the D-channel information and B-channel information onto the subscriber loop 37 connecting the TA 34 to the TAC 36 in the same manner as a standard ISDN U interface. As on the standard ISDN U interface, one D-channel and two B-channels are transmitted on the subscriber loop 37. However, in the preferred embodiment, each B-channel can carry up to four traffic channels.

FIG. 4 shows the combination of ISDN basic access protocols (Layer 1 and Layer 2) and GSM 4.08 protocols (Layer 3) that are used to carry signaling information on the D-channel of the subscriber loop 37.

Referring back to FIG. 3, all transmission between the TA 34 and the TAC 36 passes through the U' interface 124.

ANSI Standard T1.601-1992, ISDN Basic Access Layer 1 User-to-Network Interface, is the BRI physical interface implementation for the subscriber loop 37 made up of a single pair of wires, which is normal in North America.

The SIM Interface 122 accepts a normal GSM subscriber identity module card or plug-in module as described in GSM 11.11, Version 5.3.0, July 1996, which is incorporated herein by reference. The SIM interface 114 is a standard interface. GSM 11.11 describes the physical, electrical and functional specifications of the SIM interface 114.

A SIM 111 is associated with the subscriber's directory number by the GSM network. The presence of a SIM in the TA 36 allows the GSM network to deliver calls to the subscriber whose SIM is associated with the dialed directory number. A SIM must be in place at the SIM interface 122 in order for the TA 36 to originate or terminate telephone calls. A signaling link 148a connects the protocol processor 121 and the SIM Interface 122. A similar signaling link 148b connects the protocol processor 121 and the switched SIM interface 125.

In the preferred embodiment, the TA 36 has a SIM 111a plugged into the SIM Interface 122, and a SIM 111b plugged into the switched SIM interface 125. Both SIM's are associated with each ISDN terminal on the S/T Bus 113. This means that a call to the directory number associated with either SIM will cause all telephone sets connected to the S/T Bus 113 to ring.

In an alternate embodiment, multiple SIM's are installed at both the SIM Interface 122 and the switched SIM interface 125.

The switched SIM interface 125 accepts a SIM card or a plug-in SIM, using the SIM interface 114, which is described in. GSM 11.11, Version 5.3.0, July 1996. The switched SIM interface 125 connects to an activate SIM switch 150 via a switch circuit interface 152 which carries an on/off or activate/deactivate signal. When the activate SIM switch 150 is in an off/deactivate state, the switched SIM interface 125 will indicate to the protocol processor 121 that the SIM is not installed. The activate SIM switch 150 functions as a means for converting mobility events in the wired telephone system to cellular network signaling. In addition to the signalling link 148b, the switched SIM interface 125 also has a switch circuit connection 154 to relay the on/off state of the activate SIM switch 150 to the protocol processor 121. When the activate SIM switch 150 is turned on, the protocol processor 121 will activate the SIM using the TA power up procedure described elsewhere in this document, as if the TA 36 had just powered on. When the activate SIM switch 150 is turned off, the protocol processor 121 will deactivate the SIM using the "Deactivate Switched SIM" procedure. The SIM does not have to be physically removed. The activate SIM switch 150 can be placed in many locations, including on the TA 36 or on an external device, such as an MS cradle or cordless telephone base station. This allows convenient switching between public and private mode operation. "Public mode" means that the normal GSM air interface is used to deliver a call to a subscriber. "Private mode" means that a call to a GSM subscriber is delivered over the wired subscriber loop 37 to a GSM Wired Terminal Adapter.

The ISDN set 112 originates and terminates circuit-switched data communications service using normal ISDN data call procedures. The TA 36 supports data transfer rates up to 9.6 kbps. The TA 36 also supports higher data rates by setting up a high-speed circuit-switched data call, using the high speed circuit switched data service specified in the 1996 release of the ETSI GSM technical specifications (referred to as GSM 96).

TA 36 Location Updates

A location area in a PLMN 12 consists of a group of BTS 28, and each location area has a unique location area identifier. A location area in the wired environment consists of a group of TAC 34, and each location area has a unique location area identifier. A location update message is sent from a device (MS 30 or TA 36) to a visitor location register (VLR 19) to identify the location area within which the device is currently operating.

When power is applied to the TA 36, mobility logic in the TA 36 will send a location update message to the VLR 19 in the PLMN 12 for each SIM 111a installed in the TA 36. The VLR 19 will pass the location update information to the HLR 18, and both will record location information associated with the TA 36. When the activate SIM switch 150 is toggled to "On", mobility logic in the TA 36 will issue a location update message to the VLR 19 for that activated SIM 111b. The TA 36 will also issue location update messages for each active SIM 111a and SIM 111b in response to periodic location update requests from the VLR 19 which requests the VLR 19 issues to refresh its own knowledge of active SIM 111.

Seamless Transition from Wireless Operation to Wired Operation

Location update messages are used to identify the location area of the MS 30 (which contains a SIM) and SIM 111b in the TA 36. Seamless transition between PLMN 12 wireless and SOHO 16 wired operation is achieved by using duplicate copies of SIM 111b in the MS 30 and switched SIM interface 125. To switch from wireless operation to wired operation, the MS 30 is powered off, and the activate SIM switch 150 is toggled to "On". The activate SIM switch 150 may be physically located in various places, including on the TA 36, in a battery recharging cradle for the MS 30, or in a cordless telephone base station. As described previously, the TA 36 will send a location update message to the VLR 19 to indicate SIM 111b is active in the TA's 36 location area. After the location update, calls to the MS 30 MSISDN will cause page messages from the MSC 20 to be routed to the TA 36. The TA 36 will respond to the page messages, and terminate the call to the ISDN set 38 or analog set 118 associated with the SIM 111b.

Seamless transition between SOHO 16 wired and PLMN 12 wireless operation occurs when the activate SIM switch 150 is toggled to "Off", and the MS 30 is powered on. This will cause the TA 36 to send a detach message to the PLMN 12 for SIM 111b. Subsequently, the MS 30 will send a location update message to the BTS 28 in the PLMN 12. When the user carries the MS 30 away from home, calls to the MS 30 MSISDN are delivered to the MS 30 as normal mobile terminated calls.

The TA 36 has a semi-permanent SIM 111a installed. A unique MSISDN associated with the SIM 111s causes calls to the TA 36 MSISDN to be routed to the wired TA 36.

Home, Office, and Public Mobility

The MS 30 is not limited to using only one wired TA 36. For example, a subscriber can place TA's in his residence and office. This subscriber moving from home to office would be able to receive calls via the wired TA 36 at home, then via the public PLMN 12 in transit, and then, upon updating location with the wired TA 36 at his office, receive calls at his office via a wired subscriber loop 37.

Alternate Embodiments

The invention is not limited to the GSM standards for digital cellular telephone service. The invention applies equally well to the following systems:

1) Advanced Mobile Phone System (AMPS) analog cellular systems;

2) Time Division Multiple Access (TDMA) (Telecommunications Industry Association (TIA)—TIA IS-54 is the standard for TDMA digital cellular systems); and 3) Code Division Multiple Access (CDMA) (TIA IS-95 is the standard for Code Division Multiple Access digital cellular systems.)

Operation of the Preferred Embodiment

In operation, the TA 36 provides standard telephony interfaces to analog and ISDN BRI terminals. The TA 36 interworks the standard terminal signals to GSM Radio interface layer 3 messages and procedures. That is, the signals to the BSC 24 from the BTS 28 and from the TAC 34 appear identical, as to their format and protocol.

Terminal Adapter (TA 36) Flow Charts (FIGS. 5–9)

The following flow charts describe the logic of the Protocol Processor 121 of the GSM Wired Terminal Adapter 36. Protocol errors are handled as described by the appropriate ISDN and GSM specifications.

Figure 5:
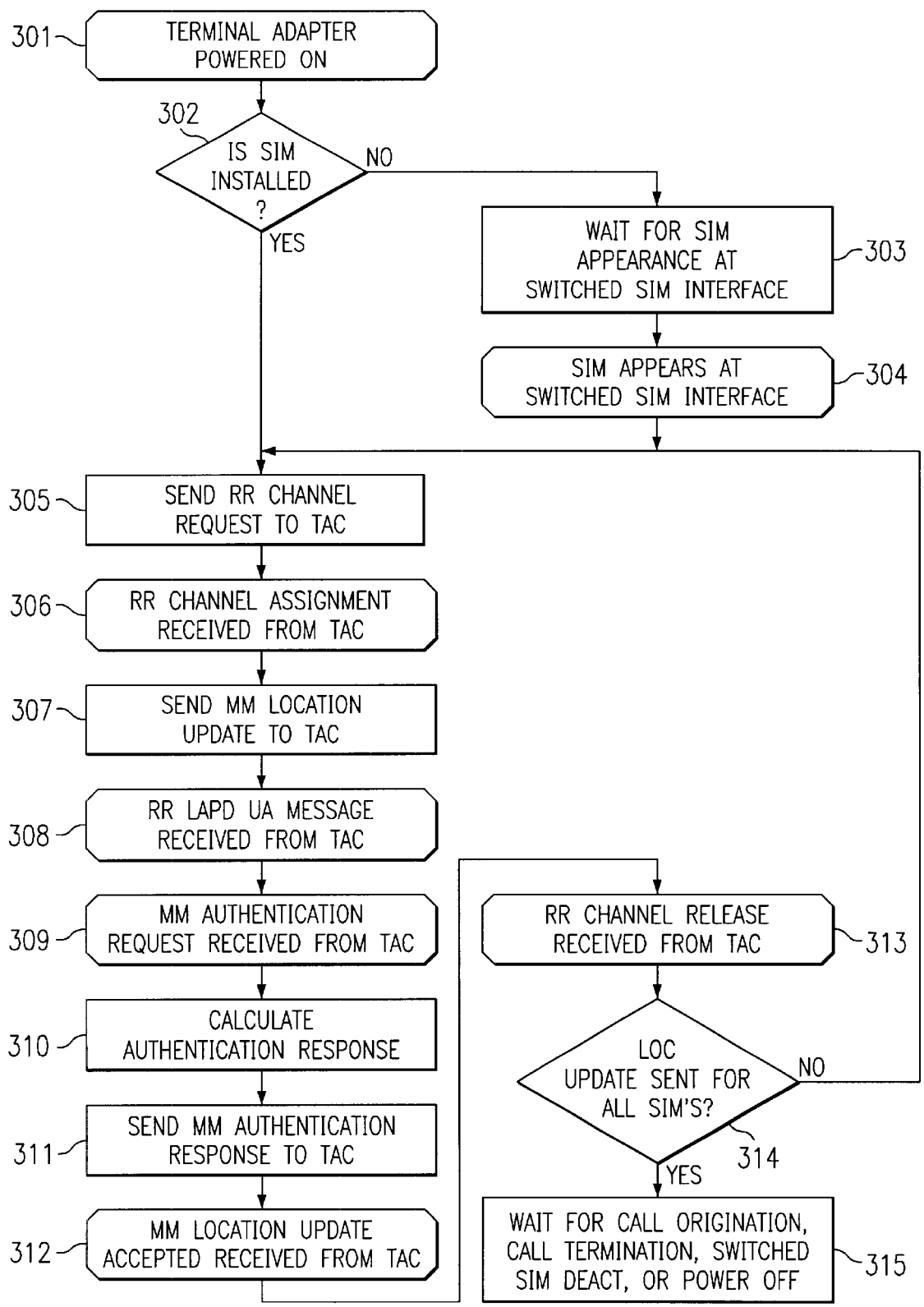

Terminal Adapter Power On (FIG. 5)

The algorithm shown in FIG. 5 is executed when, in step 301, a power switch (not shown) on the terminal adapter 36 is moved to the "On" position. In step 302, the protocol processor 121 first checks if the Subscriber Identity Module (SIM) 111a is installed at the SIM Interface 122, and if the SIM 111b is installed at the Switched SIM Interface 125. For each SIM that is installed, the TA 36 follows the normal GSM Radio Interface Layer 3 (RIL3 ) procedures for performing a location update with the GSM Network Switching System's Home Location Register, as described in GSM 4.08, sending the GSM Radio Interface Layer 3 messages for Radio Resource (RR) and Mobility Management (MM) on the D-channel of the wired subscriber loop 131, connecting the U' Interface 124 of the TA 36 to the GSM wired terminal adapter controller 34. The GSM location update procedure enables the GSM network to deliver a call to the directory number associated with a SIM to the TA 36 where that SIM is installed.

If the protocol processor 121 does not detect the SIM 111a installed at the SIM interface 122, or the SIM 111b installed at the switched SIM interface 125, then the protocol processor 121 at step 303 enters a state in which it performs no further processing, until, in step 304, it does detect the SIM 111b inserted in the switched SIM interface 125.

The protocol processor 121 then proceeds at step 305 executing the GSM location updating procedure. At step 305, the protocol processor 121 sends a GSM RIL3-RR channel request message to the TAC 34. In response, in step 306 the protocol processor 121 receives a GSM RIL3-RR channel assignment message from the TAC 34. Next, in step 307, the protocol processor 121 sends a GSM RIL3-MM location update message to the TAC 34. In step 308, the protocol processor 121 immediately receives a GSM RIL3-RR LAPD unnumbered acknowledgment (UA) message from the TAC 34.

In step 309, the protocol processor 121 receives a GSM RIL3-MM authentication request from the TAC 34. In step 310, the protocol processor 121 calculates the value for the authentication response, according to normal GSM authentication procedures. In step 311 the protocol processor 121 sends the GSM RIL3-MM authentication response message to the TAC 34. In step 312, the protocol processor 121 receives a GSM RIL3-MM location update accepted message from the TAC 34. Following this, in step 313, the protocol processor 121 receives a GSM RIL3-RR channel release message from the TAC 34. In step 314, the protocol processor 121 checks if there is a SIM installed for which no GSM location update has been sent. If so, the protocol processor 121 proceeds to step 305. In step 315, the protocol processor 121 enters a state where it is waiting for a call origination from the ISDN set 38 or the ISDN adapter 116, a call termination from the TAC 34, deactivation of the activate SIM switch 150, or the TA 36 power switched off.

Figure 6:
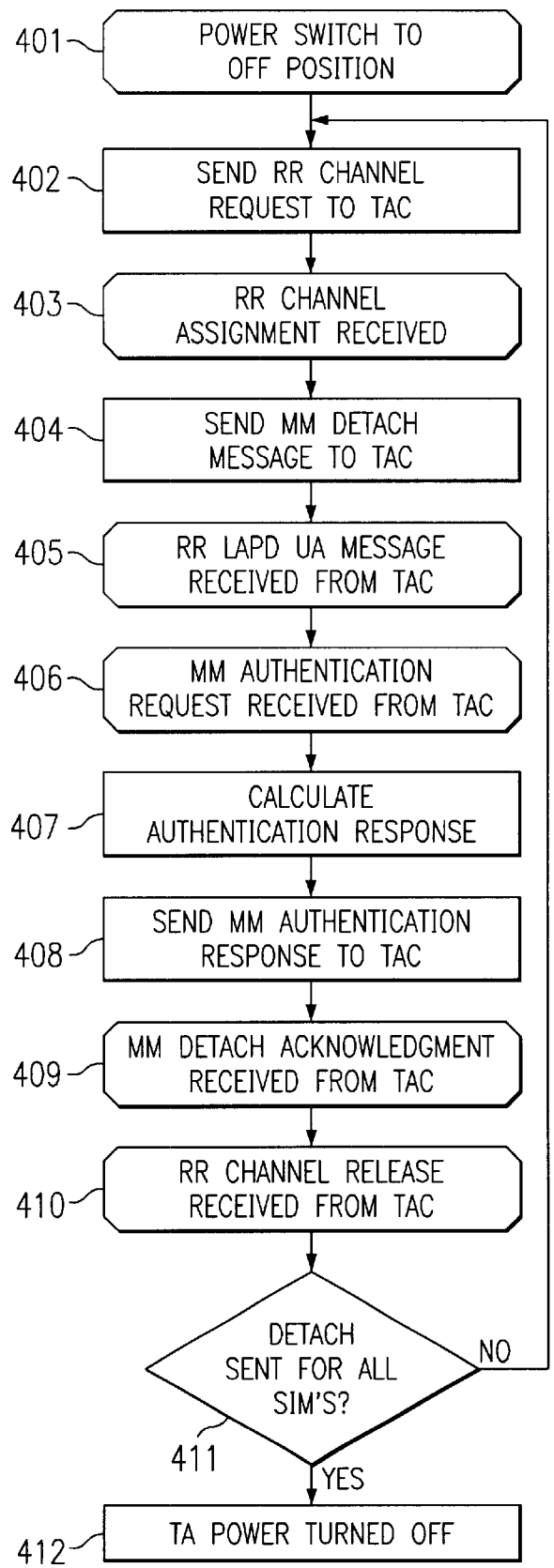
FIG. 6 is a flow chart of the algorithms used by the TA 36 when it is powered off.

Terminal Adapter Power Switched Off (FIG. 6)

The protocol processor 121 executes the algorithm in FIG. 6 when, in step 401, the power switch (not shown) of the TA 36 is moved to the off position. The protocol processor 121 performs the GSM detach procedure for both SIMs 111a and 111b, which informs the HLR 18 that the directory number associated with each SIM can no longer be reached through the network. The TA 36 remains powered until it has completed the GSM detach procedure. In step 402, the protocol processor 121 sends a GSM RIL3-RR channel request message to the TAC 34. In response, in step 403 the protocol processor 121 receives a GSM RIL3-RR channel assignment message. In step 404 the protocol processor 121 then sends a GSM RIL3-MM detach message for the SIM 111a to the TAC 34. In step 405, the response to the GSM RIL3-MM detach message is a LAPDm unnumbered acknowledgment (UA) message from the TAC 34, followed, in step 406, by the GSM RIL3-MM authentication request received. On receipt of the authentication request, the protocol processor 121 in step 407 calculates the authentication response using the GSM authentication algorithm, and in step 408 sends it to the TAC 34 in a GSM RIL3-MM authentication response message. In step 409, the response from the TAC 34 is a GSM-RIL3-MM detach acknowledgment received by the protocol processor 121. In step 410, the protocol processor 121 receives a GSM RIL3-RR channel release from the TAC 34. In step 411, the protocol processor 121 checks if the SIM 111b is installed at the switched SIM interface 125. If it is, the GSM detach procedure is repeated starting at step 402, but this time specifying the SIM 111b in the GSM RIL3-MM detach message in step 404. In step 412, only after the GSM detach procedure has been completed for each installed SIM is the power turned off to the TA 36. The TA 36 must be powered off prior to removing the SIM 111a from the SIM Interface 122. The activate SIM switch 150 must be in the "deactivated" position prior to removing the SIM 111b from the switched SIM interface 125.

Figure 7A:
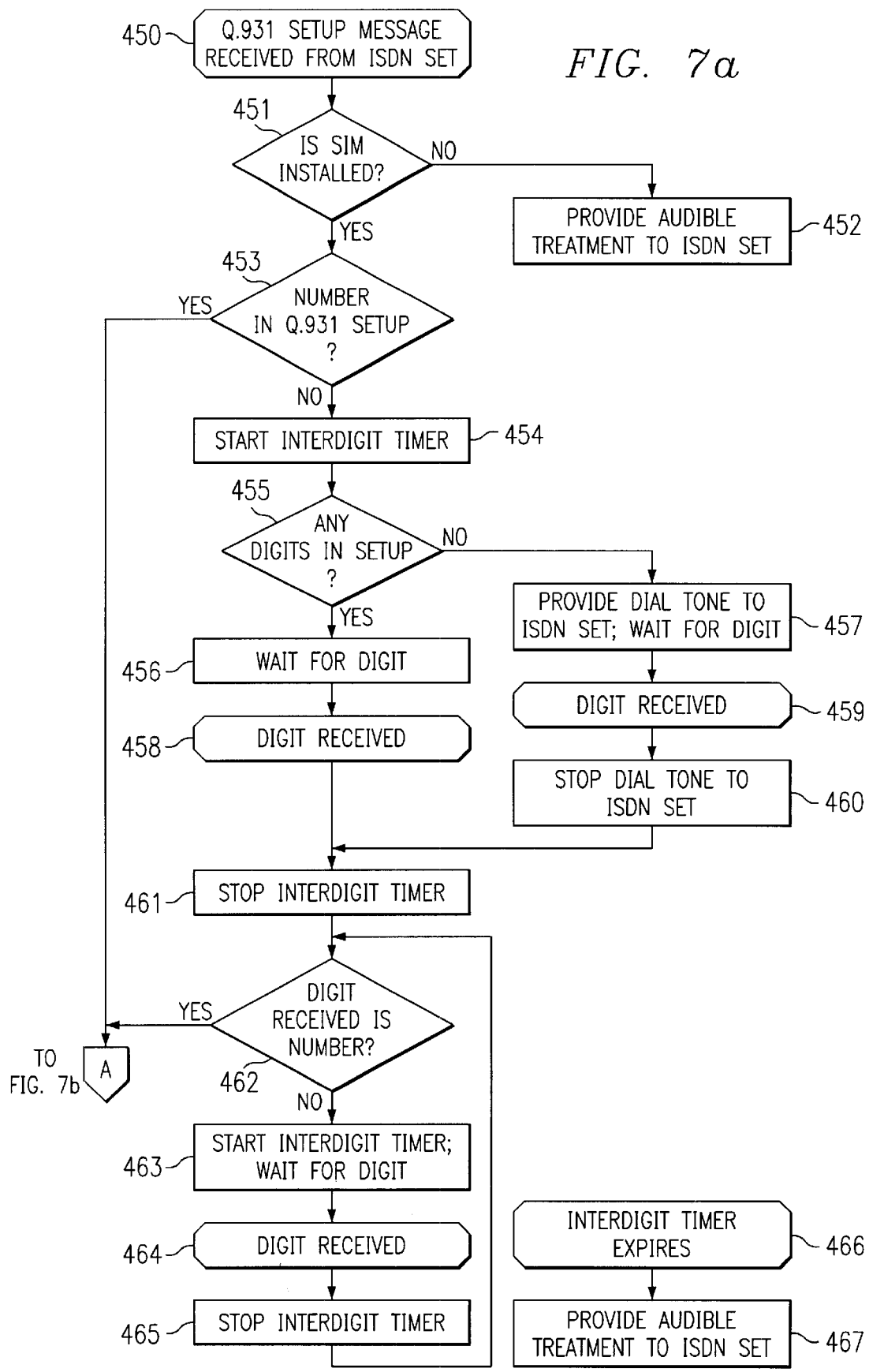
FIG. 7 is a flow chart of the algorithms used by the protocol processor 121 when a subscriber places a call.
Figure 7B:
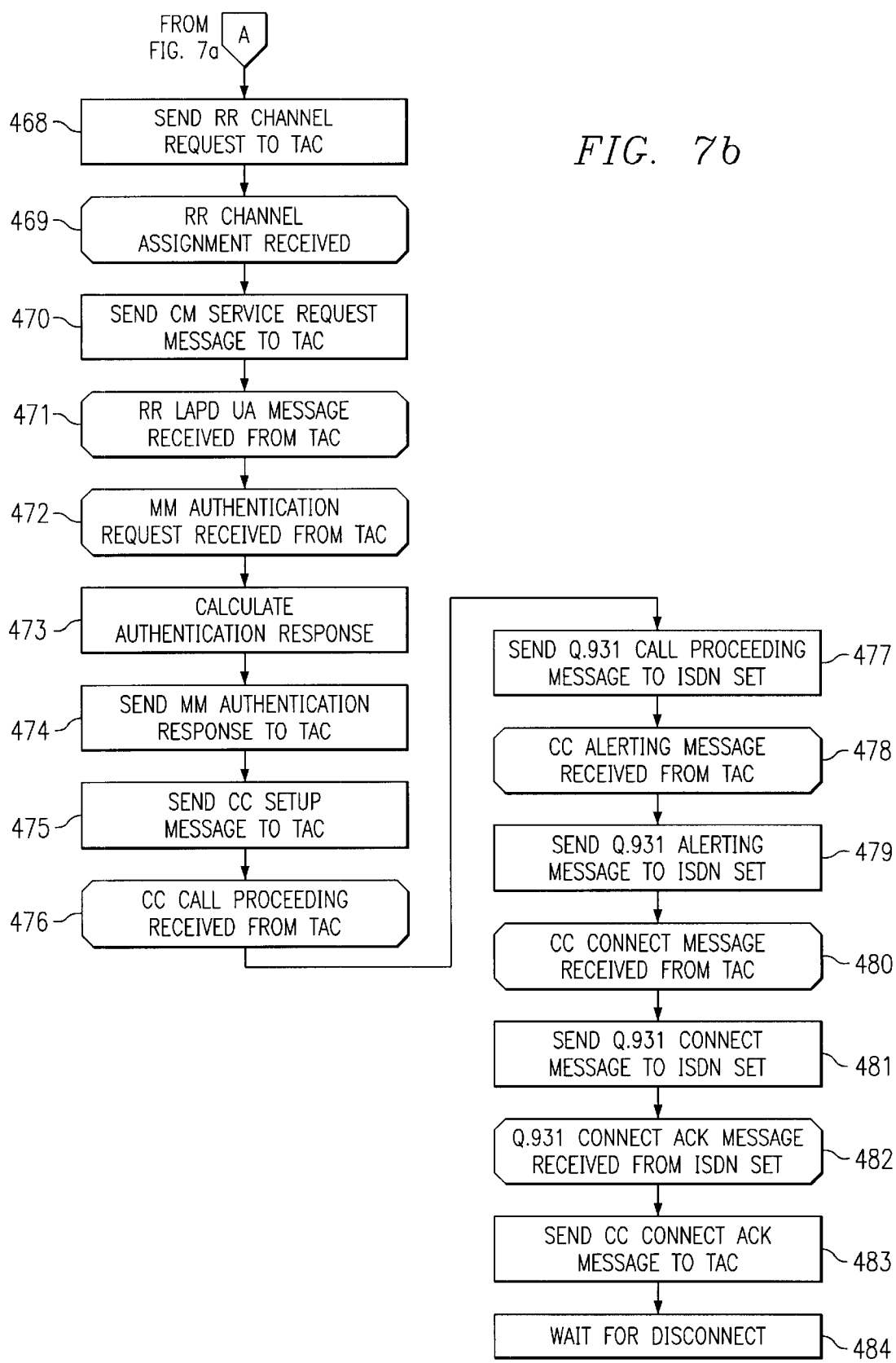

Subscriber Places a Call (FIGS. 7a and 7b)

The algorithm shown in FIG. 7 is executed by the protocol processor 121 when the ISDN set 38 or the analog set with ISDN adapter 39 is used by the subscriber to place a call. From the perspective of the protocol processor 121, the analog set with ISDN adapter 39 presents the same call control signaling interface as the ISDN set 38. Either of these devices, when used by the subscriber to place a call, will, in step 450 of FIG. 7a, send an ISDN Q.931 setup message via the S/T Bus interface 120 to the protocol processor 121, which initiates the call setup procedure. References to "ISDN set" in FIG. 7 refer to both the ISDN set 38 and/or the analog set with ISDN adapter 39.

In step 451, the protocol processor 121 checks if the SIM 111a is installed at the SIM interface 122, or if the SIM 111b is installed at the switched SIM interface 125. If neither the SIM 111a nor the SIM 111b is installed, then in step 452 the protocol processor 121 instructs the voice service module 123 to provide an audible treatment to the subscriber. This treatment can be a pre-recorded voice announcement stating that there is no SIM installed, or a standard telephony "reorder" tone. If either the SIM 111a or the SIM 111b is installed, then the protocol processor 121 proceeds to step 453.

When placing a call, the subscriber must press the octothorpe key (#) after dialing the called number. In step 453, the protocol processor 121 examines the contents of the ISDN Q.931 setup message. If the ISDN Q.931 setup message contains no dialed digits, or if the called party address in the ISDN Q.931 setup message contains a string of dialed digits that does not end with an octothorpe (#), then in step 454 the protocol processor 121 starts an interdigit timer, and collects digits until an octothorpe (#) is encountered. In step 455, the protocol processor 121 determines if the ISDN Q.931 setup message contains dialed digits.

If there are no dialed digits, then in step 457 the protocol processor 121 also instructs the voice service module 123 to play dialtone to the ISDN set 38 or ISDN adapter 116. In step 459, when the protocol processor 121 receives the first digit, then in step 460 it instructs the voice service module 123 to stop the dial tone. When the protocol processor 121 receives a digit in step 458 or in step 459, then in step 461 it stops the interdigit timer.

The interdigit timer is normally five seconds, but can be configured to other values. If the interdigit timer expires (step 466) between the reception of individual digits at any time prior to the protocol processor 121 receiving an octothorpe, then in step 467 the voice service module 123 provides an audible treatment to the ISDN set 38 or ISDN adapter 116. This treatment can be a pre-recorded voice announcement instructing the subscriber to redial the called number, or a standard telephony "reorder" tone.

Each time the protocol processor 121 receives a digit at step 458 and step 459, it first stops the interdigit timer at step 461, and then in step 462 checks if the received digit is an octothorpe. If it is not, the protocol processor 121 starts the interdigit timer, and in step 463 waits for the next digit.

If the digit is an octothorpe, then, referring to FIG. 7b, the protocol processor 121 proceeds with the normal GSM call setup procedure in step 468, beginning by sending a GSM RIL3-radio resource channel request message to the TAC 34. If, in step 453 of FIG. 7a, the called party address in the ISDN Q.931 setup message contains a string of dialed digits ending with an octothorpe (#), then beginning at step 468 in FIG. 7b, the protocol processor 121 performs the normal GSM call setup procedure. In response to the GSM RIL3-RR channel request message, in step 469 the TA 36 receives a GSM RIL3-RR channel assignment. In step 470 the protocol processor 121 sends a GSM RIL3-MM CM service request.

The response to the GSM RIL3-MM CM service request is a GSM RIL3-RR LAPDm unnumbered acknowledgment (UA) message received in step 471, followed by the GSM RIL3-MM authentication request received in step 472. On receipt of the authentication request, the protocol processor 121 calculates the authentication response in step 473 using the GSM authentication algorithm, and sends it to the TAC in a GSM RIL3-MM authentication response message in step 474. At this point, the protocol processor 121 in step 475 converts the ISDN Q.931 setup message that was received in step 450 into a GSM RIL3-CC setup message, and sends it to the TAC 34.

Following this, in step 476 the TA 36 receives a GSM RIL3-CC call proceeding message, which the protocol processor 121 converts into an ISDN Q.931 call proceeding message. In step 477, the protocol processor 121 sends it to the ISDN set 38 or ISDN adapter 116 via the S/T Bus Interface 120. In a similar fashion, in step 478 the protocol processor 121 converts the incoming GSM RIL3-CC alerting message into an ISDN Q.931 alerting message, which, in step 479 is sent to the ISDN set 38 or ISDN adapter 116.

When the called party answers, in step 480 the protocol processor 121 converts the resultant incoming GSM RIL3-CC connect message from the TAC 34 into an ISDNQ.931 connect message, which in step 481 is passed to the ISDN set 38 or ISDN adapter 116.

In step 482, an ISDN Q.931 connect acknowledgment message is received from the ISDN set 38 or ISDN adapter 116. In step 483, the protocol processor 121 sends a GSM RIL3-CC connect acknowledgment to the TAC 34. In step 484 the protocol processor 121 enters an active call state, waiting for either an ISDN Q.931 disconnect message from the ISDN set 38 or ISDN adapter 116, or a GSM RIL3-CC disconnect message from the TAC 34.

Figure 8A:
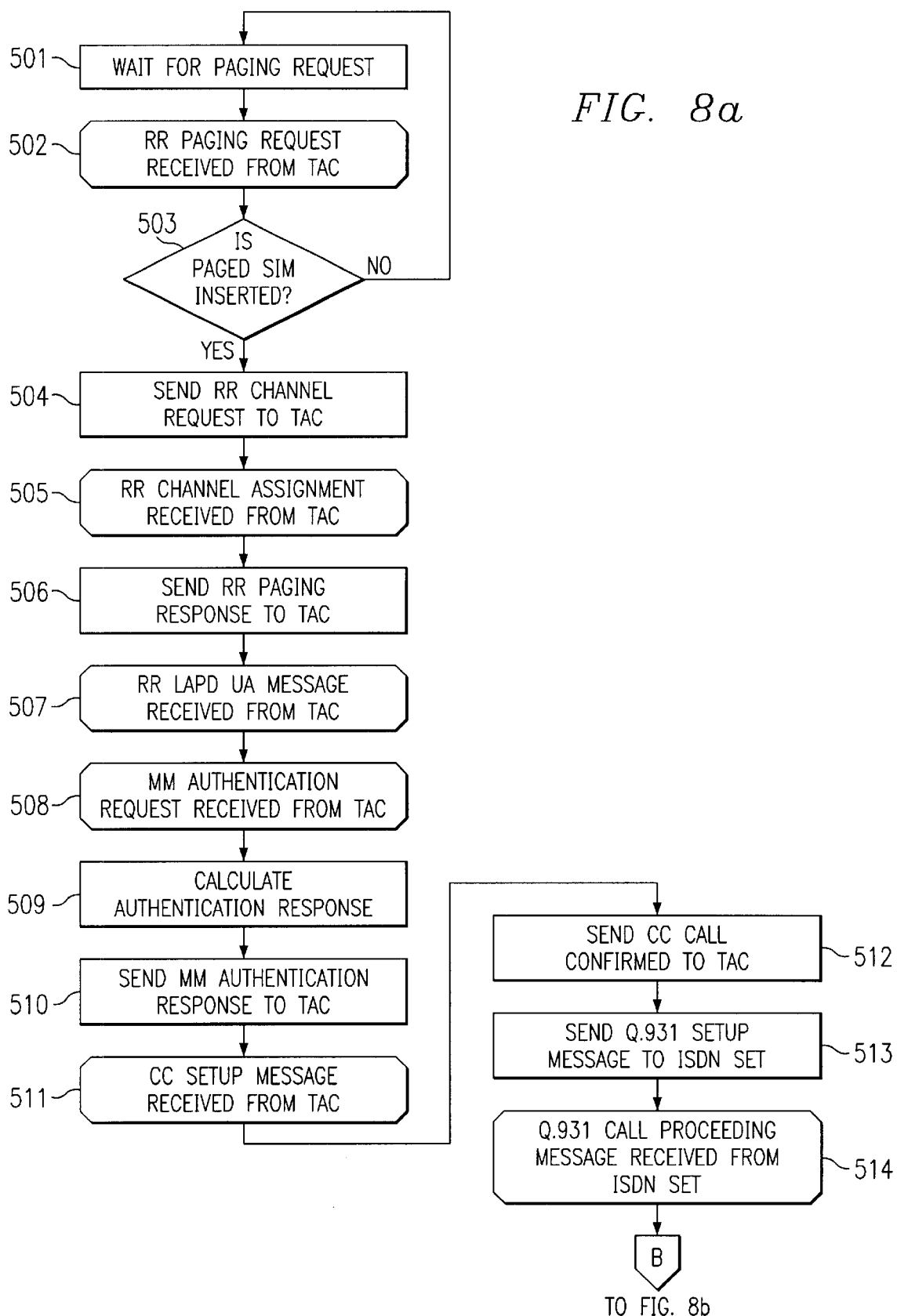
FIG. 8 is a flow chart of the algorithms used by the protocol processor 121 when a subscriber is called.
Figure 8B:
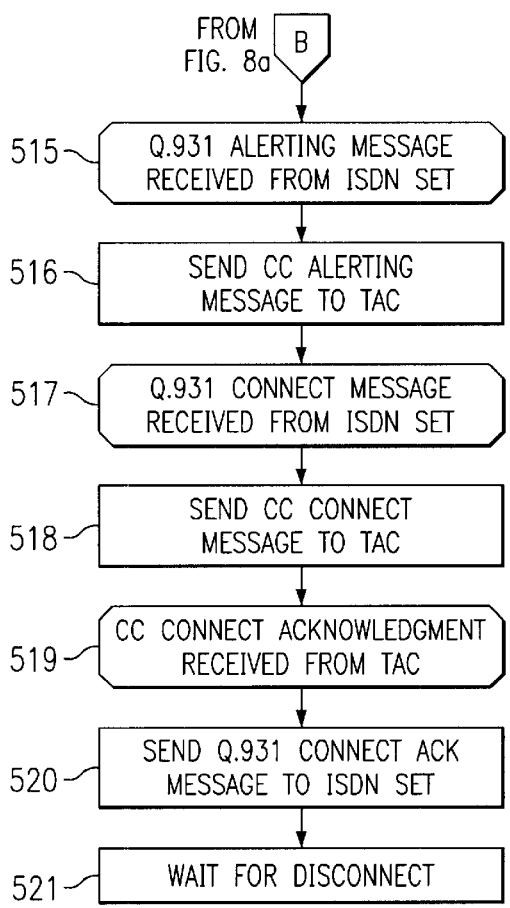

Subscriber is Called (FIGS. 8a and 8b)

In step 501 the protocol processor 121 waits for a paging request. The algorithm shown in FIG. 8 is executed when, in step 502, the TA 36 receives a GSM RIL3-RR paging request message from the TAC 34. In step 503, the protocol processor 121 checks if the SIM specified in the paging request is installed at the SIM interface 122 or the switched SIM interface 125. If the specified SIM is not installed, then the protocol processor 121 does not respond to the paging request, but returns to step 501, where it waits for a paging request.

If the requested SIM is installed-at either the SIM interface 122 or at the Switched SIM Interface 125, then in step 504 the protocol processor 121 sends a GSM RIL3-RR channel request to the TAC 34. In step 505, the protocol processor 121 receives a GSM RIL3-RR channel assignment message from the TAC 34. In step 506, the protocol processor 121 sends a GSM RIL3-RR paging response message to the TAC34, indicating that the paged SIM is available at the TA 36. The TAC 34 immediately responds with a GSM RIL3-RR LAPD unnumbered acknowledgment (UA) message which, in step 507, the Protocol processor 121 receives.

Following this, in step 508 the protocol processor 121 receives a GSM RIL3-MM authentication request from the TAC 34. In step 509 the protocol processor 121 calculates the value for the authentication response according to normal GSM authentication procedures. In step 510 the protocol processor 121 sends the GSM RIL3-MM authentication response message to the TAC 34. In step 511, the protocol processor 121 receives a GSM RIL3-call control (CC) setup message from the TAC 34. In step 512, the protocol processor 121 responds to the TAC 34 with a GSM RIL3-CC call confirmed message, then converts the GSM RIL3-CC Setup message into an ISDN Q.931 Setup message and at step 513 sends that to the ISDN set 38 and to the ISDN adapter 116. In step 514, the protocol processor 121 receives an ISDN Q.931 call proceeding message from the ISDN set 38 and the ISDN adapter 116.

Referring now to FIG. 8b, in step 515, the protocol processor 121 receives an ISDN Q.931 alerting message. In step 516, the protocol processor 121 sends a GSM RIL3-CC alerting message to the TAC 34. In step 517, when the protocol processor 121 receives an ISDN Q.931 connect message from either the ISDN set 38 or the ISDN adapter 116, in step 518 it is converted toa GSM RIL3-CC connect message, which is sent to the TAC 34. In step 519, in response to this message, the TAC 34 sends a GSM RIL3-CC connect acknowledgment message. In step 520, the protocol processor 121 converts this to a ISDNQ.931 connect acknowledgment message, and sends it to the ISDN set 38 or the ISDN adapter 116. In step 521, the protocol processor 121 then enters an active call state, waiting for either an ISDN Q.931 disconnect message from the ISDN set 38 or ISDNadapter 116, or a GSM RIL3-CC disconnect message from the TAC 34.

Figure 9:
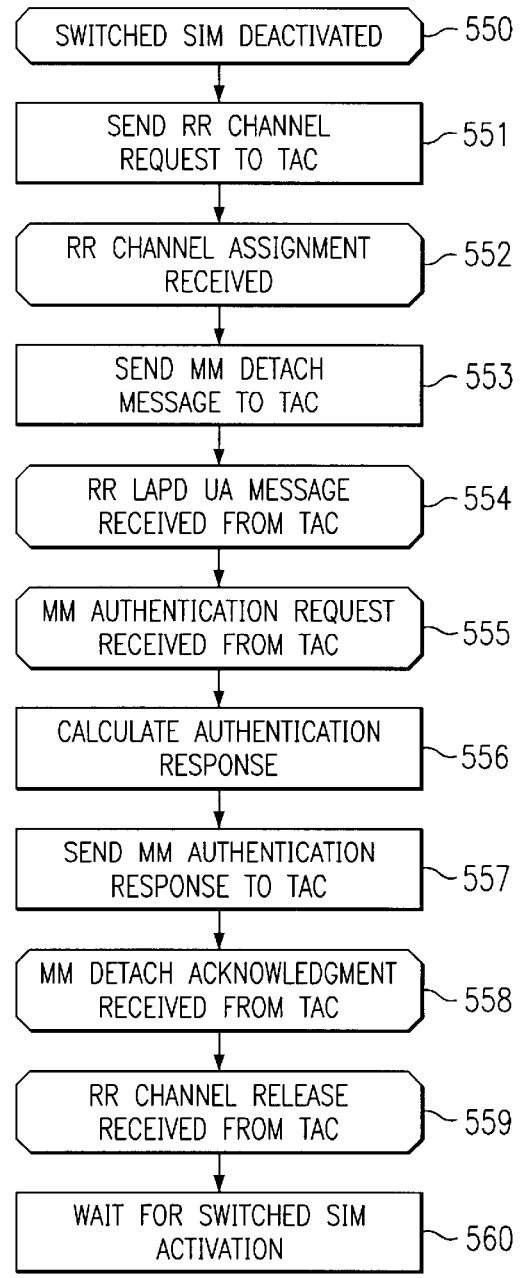
FIG. 9 is a flow chart of the algorithms used by the protocol processor 121 when the activate SIM switch 150 is deactivated.

Switched SIM Deactivation (FIG. 9)

The algorithm shown in FIG. 9 is executed when the activate SIM switch 150 is set to the "deactivate" position. In step 550 the protocol processor 121 detects this change through the switch circuit connection 154. In step 551 the protocol processor 121 sends a GSM RIL3-RR channel request message to the TAC 34. In response, the protocol processor 121 receives a GSM RIL3-RR channel assignment message in step 552. The protocol processor 121 then sends a GSM RIL3-MM detach message for the SIM 111b to the TAC 34 in step 553. In step 554, the response to the GSM RIL3-MM detach message is a LAPDm unnumbered acknowledgment (UA) message from the TAC 34, followed by the GSM RIL3-MM authentication request received, in step 555. On receipt of the authentication request, the protocol processor 121 calculates the authentication response in step 656 using the GSM authentication algorithm, and sends it to the TAC 34 in a GSM RIL3-MM authentication response message in step 557. In step 558, the protocol processor 121 receives a GSMRIL3-MM detach acknowledgment from the TAC 34. Following this, the protocol processor 121 receives a GSM RIL3-RR channel release message from the TAC 34 in step 559. In step 560, the protocol processor 121 enters a state in which it waits for the activate SIM switch 125 to be switched back to the "activate" position.

Figure 10:
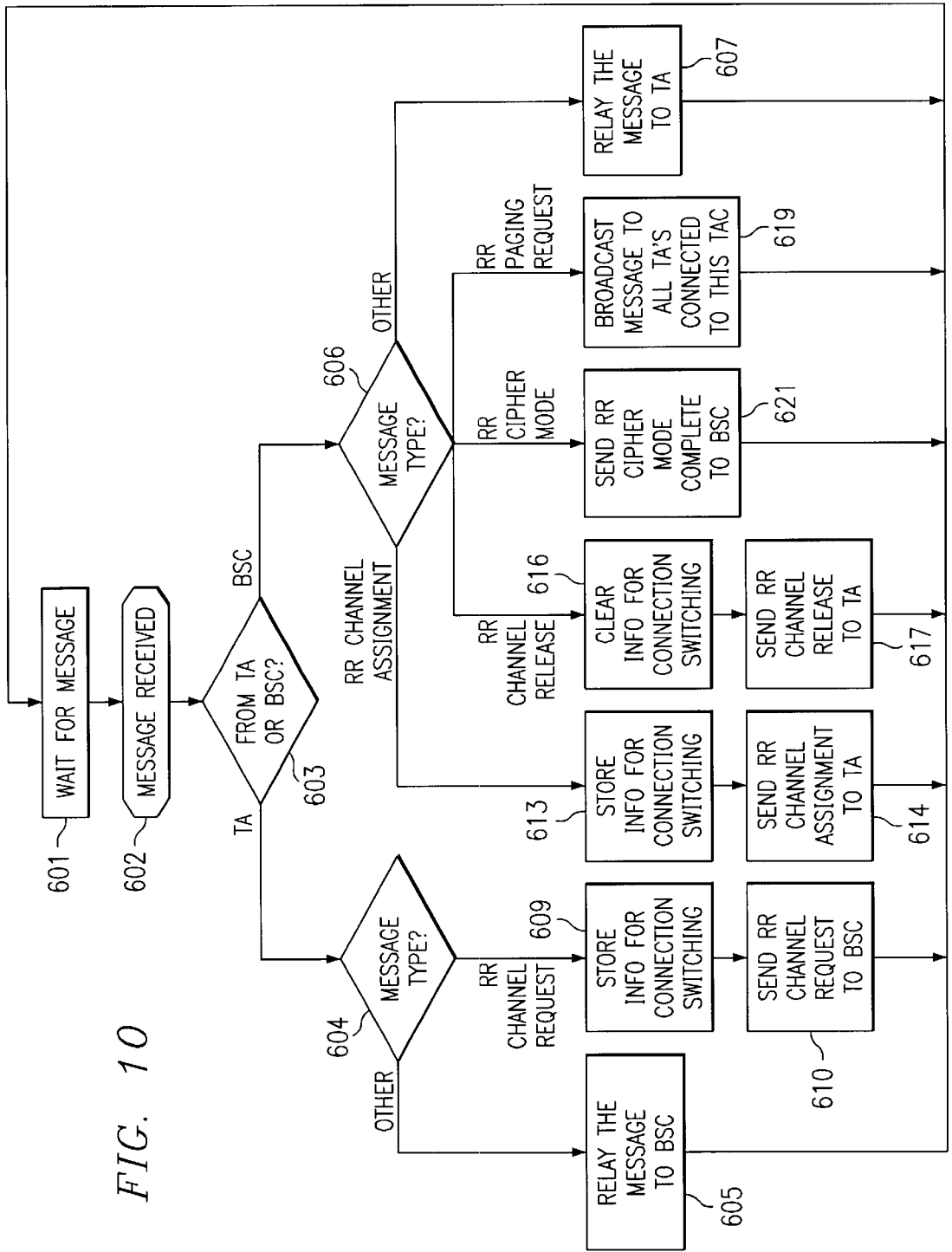
FIG. 10 is a flow chart of the algorithm used by the TAC 34 when processing incoming messages.

Terminal Adapter Controller (TAC 34) Flow Chart (FIG. 10)

The algorithms of the TAC 34 are shown in FIG. 10. When the TAC 34 receives a message from the BSC 24 in step 602, the TA controller application 214 checks in step 603 whether the message is from the TA 36 or from the BSC 24. If from the TA 36, in step 604 the TA controller application 214 checks if it is a GSM RIL3-RR channel request message. If not, the TA controller application 214 relays the message unaltered to the BSC 24 in step 605, and proceeds to step 601, where it waits for the next incoming message.

If the message in step 604 is a GSM RIL3-RR channel request message, then in step 609 the TA controller application 214 stores information from the message that it needs to properly switch the traffic channel connection. The TA controller application 214 then sends the message unaltered to the BSC 24 in step 610, and proceeds to step 601, where it waits for the next incoming message.

At step 603, if the message is from the BSC 24, then the TA controller application 214 checks in step 606 if it is a GSM RIL3-RR channel assignment message, a GSM RIL3- channel release message, a GSM RIL3-RR cipher mode message, or a GSM RIL3-RR paging request. If it is not one of these, the TA controller application 214 relays the message unaltered to the TA 36 in step 607, and proceeds to step 601 where it waits for the next incoming message. If the TA Controller Application 214 is processing a GSM RIL3-RR channel assignment message, it stores information from the message in step 613 that it needs to properly switch the traffic channel connection. It then relays the message unaltered to the TA 36 in step 614, and proceeds to step 601 where it waits for the next incoming message.

In step 606, if the message is a GSM RIL3-RR channel release message, the TA controller application 214 clears the information for switching the traffic channel connection associated with that message in step 616. It then relays the message unaltered to the TA 36 in step 617, and proceeds to step 601 where it waits for the next incoming message. In step 606, if the message is a GSM RIL3-RR paging request message, then in step 619 the TA Controller application 214 broadcasts the message to all TA's 36 which are connected to the TAC 34. The TA Controller application 214 then proceeds to step 601 where it waits for the next incoming message.

In step 606, if the message is a GSM RIL3-RR cipher mode, then the TA controller application 214 sends a GSM RIL3-RR cipher mode complete message to the BSC 24 in step 621. The GSM RIL3-RR cipher mode message is not relayed to the TA 36. The TA controller application 214 then proceeds to step 601 where it waits for the next incoming message.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A system to enable communication between a base station controller within a cellular network operating according to a cellular network signaling format, and a wired telephone in a wired subscriber loop, the system comprising:
   a. a terminal adapter directly connected to the wired telephone in the wired subscriber loop;
   b. a terminal adapter controller directly connected to both the base station controller and to the terminal adapter, for receiving signals from the terminal adapter, converting the signals from the wired telephone via the terminal adapter consistent with the cellular network signaling format, and providing the converted signals to the base station controller so that the signals from the wired telephone that are received at the base station controller appear to be from a wireless telephone operating under the cellular network signaling format allowing the wired telephone to originate and terminate calls as if it were a wireless terminal.

2. The system of claim 1, wherein the cellular network signaling is GSM signaling format.

3. The system of claim 2, wherein the terminal adapter includes a voice service module, conductively coupled to the terminal adapter controller, for compressing voice data to standard cellular compression.

4. The system of claim 1, wherein the cellular network signaling is Advanced Mobile Phone System signaling format.

5. The system of claim 4, wherein the terminal adapter includes a voice service module, conductively coupled to the terminal adapter controller, for compressing voice data to standard cellular compression.

6. The system of claim 1, wherein the cellular network signaling is Time Division Multiple Access signaling format.

7. The system of claim 6, wherein the terminal adapter includes a voice service module, coupled to the terminal adapter controller, for compressing voice data to standard cellular compression.

8. The system of claim 1, wherein the cellular network signaling is Code Division Multiple Access signaling format.

9. The system of claim 8, wherein the terminal adapter includes a voice service module, coupled to the terminal adapter controller, for compressing voice data to standard cellular compression.

10. The system of claim 1, further comprising:
   c. mobility logic, within the terminal adapter, the mobility logic providing the terminal adapter controller with information which enables the base station controller to locate a subscriber within the wired telephone system.

11. The system of claim 10, wherein the mobility logic further comprises means for storing information relating to the subscriber, the information including a telephone number associated with the subscriber.

12. The system of claim 11, wherein the first telephone and a second telephone are capable of receiving the terminal adapter.

13. The system of claim 12, wherein the base station controller associates the subscriber with the first telephone when the terminal adapter is received by the first telephone.

14. The system of claim 13, wherein the base station controller associates the subscriber with a second wired telephone when the terminal adapter is received by the second telephone.

15. The system of claim 14, wherein the base station controller provides communication services for the subscriber associated with the telephone number at the first telephone when the terminal adapter is received by the first telephone.

16. The system of claim 15, wherein the base station controller provides communication services for the subscriber associated with the telephone number at the second telephone when the terminal adapter is received by the second telephone.

17. The system of claim 1, wherein the terminal adapter includes a voice service module, conductively coupled to the terminal adapter controller, for compressing voice data to standard cellular compression.

18. A system to enable communication between a base station controller within a cellular network operating according to a cellular network signaling format, and a wired telephone system in a wired subscriber loop, the system comprising:

a. a terminal adapter located at a first facility and connectable to a first wired telephone of the wired telephone system;

b. a terminal adapter controller located at a second facility, separated from the first facility, and conductively coupled both to the base station controller and to the terminal adapter, for receiving signals from the terminal adapter, converting the signals consistent with the cellular network signaling format, and providing the converted signals to the base station controller so that the signals from the wired telephone appear to be from a wireless telephone operating under the cellular network signaling format and the base station controller is able to locate a subscriber in the wired telephone network via a subscriber identification device, the subscriber identification device also for providing specific subscriber-related data to the terminal adapter controller for use in providing the converted signals to the base station controller.

19. The system of claim 1 wherein the subscriber identification device is also used to provide specific subscriber-related data to the terminal adapter controller for use in providing the converted signals to the base station controller.

20. The system of claim 19 wherein the first facility is a small office/home office (SOHO) and the second facility is a local exchange carrier (LEC).

* * * * *